United States Patent
Roberts et al.

(10) Patent No.: US 9,043,837 B2
(45) Date of Patent: May 26, 2015

(54) MEDIA CONTENT DISCOVERY IN AN INTEGRATED MEDIA SERVICE THAT DISTRIBUTES MEDIA CONTENT BY WAY OF A PLURALITY OF DIFFERENT MEDIA DISTRIBUTION MODELS

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US); Jeffrey L. Harris, Leesburg, VA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 0 days.

(21) Appl. No.: 14/043,589

(22) Filed: Oct. 1, 2013

(65) Prior Publication Data
US 2014/0157314 A1 Jun. 5, 2014

Related U.S. Application Data

(60) Provisional application No. 61/732,247, filed on Nov. 30, 2012.

(51) Int. Cl.
*G06F 3/00* (2006.01)
*G06F 13/00* (2006.01)
(Continued)

(52) U.S. Cl.
CPC .............. *G06F 3/0481* (2013.01); *H04L 67/10* (2013.01); *G06F 3/0482* (2013.01); *H04N 21/4722* (2013.01); *H04N 21/472* (2013.01); *H04N 21/218* (2013.01); *H04N 21/482* (2013.01); *H04N 21/27* (2013.01); *H04N 21/47202* (2013.01); *G06Q 30/02* (2013.01); *G06Q 30/0607* (2013.01); *G06Q 30/0609* (2013.01)

(58) Field of Classification Search
USPC ............................... 725/40, 44–45, 61, 52–54
See application file for complete search history.

(56) References Cited

U.S. PATENT DOCUMENTS 7,941,819 B2 * 5/2011 Stark et al. ...................... 725/45
8,108,393 B2 * 1/2012 Yang et al. .................... 707/737
(Continued)

*Primary Examiner* — Mulugeta Mengesha

(57) ABSTRACT

An exemplary method includes a media service provider system 1) providing an end user of an integrated media service with access to a media program by way of a plurality of different media distribution models, 2) maintaining a catalog that includes comprehensive information about the media program, the comprehensive information being an aggregate of non-redundant information about the media program obtained from a plurality of independent source catalogs corresponding to the plurality of different media distribution models, and 3) providing, based on the comprehensive information included in the catalog, a media service user interface that supports discovery of the comprehensive information about the media program regardless of a user interface context from which a user request for information about the media program is received. Corresponding systems and methods are also described.

19 Claims, 11 Drawing Sheets

(51) Int. Cl.

| | | |
|---|---|---|
| H04N 5/445 | (2011.01) | |
| G06F 3/0481 | (2013.01) | |
| H04L 29/08 | (2006.01) | |
| G06F 3/0482 | (2013.01) | |
| H04N 21/4722 | (2011.01) | |
| H04N 21/472 | (2011.01) | |
| H04N 21/218 | (2011.01) | |
| H04N 21/482 | (2011.01) | |
| H04N 21/27 | (2011.01) | |
| G06Q 30/02 | (2012.01) | |
| G06Q 30/06 | (2012.01) | |

(56) References Cited

U.S. PATENT DOCUMENTS

| | | | |
|---|---|---|---|
| 8,250,614 B1 * | 8/2012 | Ellis et al. | 725/87 |
| 8,365,235 B2 * | 1/2013 | Hunt et al. | 725/88 |
| 8,584,165 B1 * | 11/2013 | Kane et al. | 725/44 |
| 2011/0060456 A1 * | 3/2011 | Lowe et al. | 700/237 |
| 2012/0233640 A1 * | 9/2012 | Odryna et al. | 725/45 |

\* cited by examiner

MEDIA CONTENT DISCOVERY IN AN INTEGRATED MEDIA SERVICE THAT DISTRIBUTES MEDIA CONTENT BY WAY OF A PLURALITY OF DIFFERENT MEDIA DISTRIBUTION MODELS

RELATED APPLICATIONS

The present application claims priority under 35 U.S.C. §119(e) to U.S. Provisional Patent Application No. 61/732, 247, filed Nov. 30, 2012. The contents of the provisional patent application are hereby incorporated by reference in their entirety.

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video service typically provides a user of the service with tools for discovering video programs offered for access through the video service. While a conventional video service provides useful tools for discovery of the video programs offered by the service, there remains room for new and/or improved tools that may further benefit users and/or a provider of the service. For example, there remains room to improve user interface tools to better assist a user of the service in intuitively, conveniently, and/or comprehensively discovering information about video programs and/or the ways that the video programs are accessible by the user through the video service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service provider systems and methods that provide integrated user discovery of and access to media content in an integrated media service that distributes media content by way of a plurality of different media distribution models are described herein. The systems and methods described herein may facilitate convenient, intuitive, and/or otherwise helpful discovery of media content, which may include discovery of comprehensive information about media content regardless of a user interface context from which a user request for information about the media content is received.

For example, in an exemplary method, a media service provider system may 1) provide an end user of an integrated media service with access to a media program by way of a plurality of different media distribution models, 2) maintain a catalogue that includes comprehensive information about the media program, the comprehensive information being an aggregate of non-redundant information about the media program obtained from a plurality of independent source catalogues corresponding to the plurality of different media distribution models, and 3) provide, based on the comprehensive information included in the catalogue, a media service user interface that supports discovery of the comprehensive information about the media program regardless of a user interface context from which a user request for information about the media program is received.

In certain examples, the providing of the media service user interface may include the media service provider system providing one or more user interface views for display. For example, the media service provider system may 1) provide a filtered browse view for display on a display screen, the filtered browse view providing a particular user interface context in which only media programs accessible by way a particular one of the media distribution models are represented in the filtered browse view, 2) receive, within the filtered browse view, a user request for information about the media program, and 3) provide an information view for the media program for display in response to the user request, the information view for the media program including the comprehensive information about the media program.

The systems and methods described herein may benefit end users and/or a provider of a media service. For example, one or more of the features described herein may enhance user experiences with discovery of media content and/or the media distribution models by way of which the media programs are accessible through the media service. Exemplary media service provider systems and methods that provide integrated user discovery of and access to media content in an integrated media service that distributes media content by way of a plurality of different media distribution models will now be described in reference to the accompanying drawings.

Figure 1:
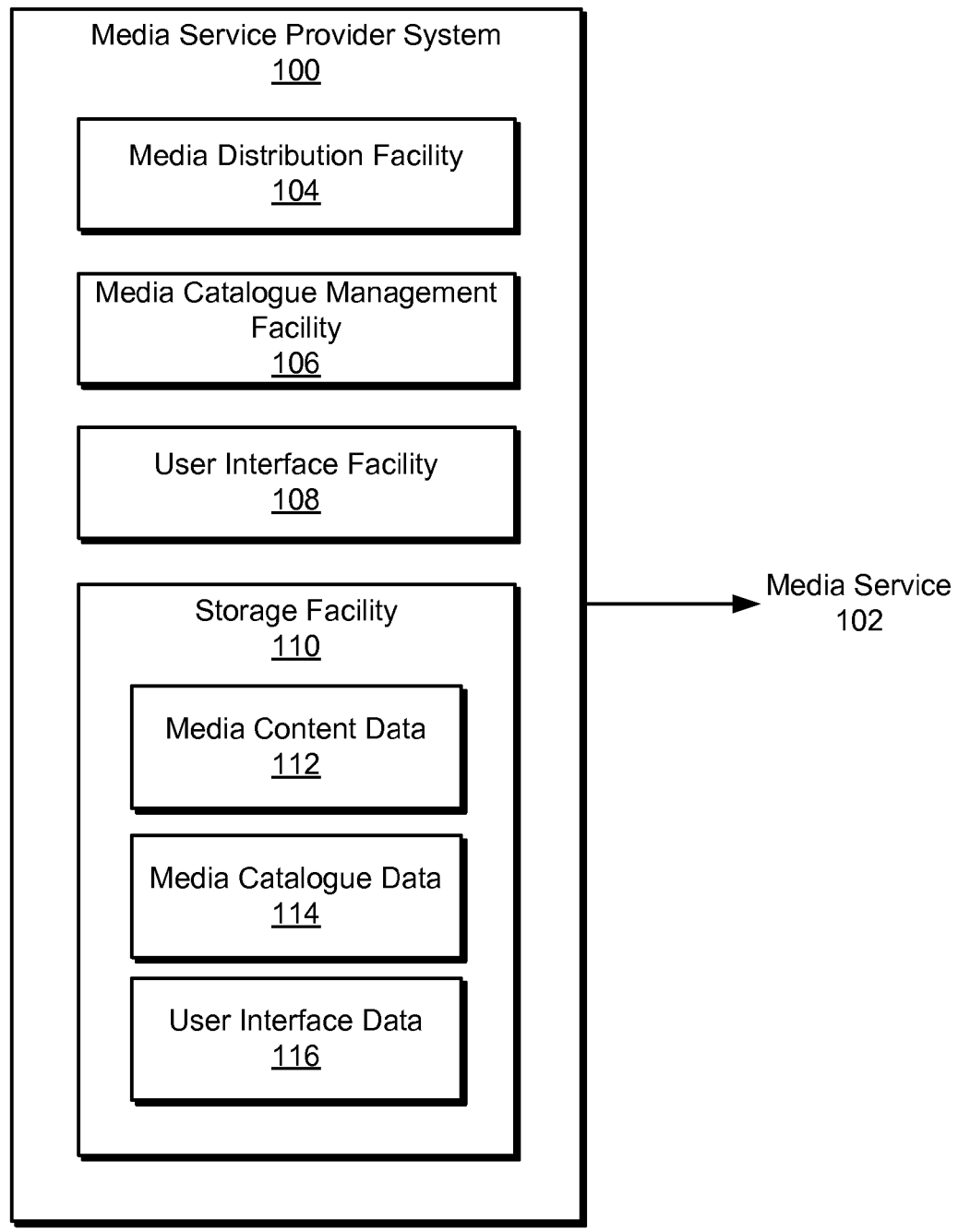
FIG. 1 illustrates an exemplary media service provider system according to principles described herein.

FIG. 1 illustrates an exemplary media service provider system 100 ("system 100"). System 100 may be configured to facilitate discovery, access, and/or consumption of media content by one or more users. For example, system 100 may be configured to provide a media service 102 to one or more end users of the media service 102 (e.g., one or more subscribers to the media service 102). System 100 may be associated with (e.g., operated by) a provider of the media service 102 ("service provider"). Through the media service 102, an end user of the media service may discover, access, and/or consume media content distributed by system 100.

In certain examples, the media service 102 may be an integrated media service 102 at least because the media service 102 distributes media content by way of multiple different media distribution models, thus providing an end user of the media service 102 with access to media content by way of multiple different media distribution models. In certain examples, the multiple different media distribution models may be an integrated set of media distribution models that is formed by combining subsets of media distribution models and that provides integrated access to media content by way of the integrated set of media distribution models. Examples of media distribution models associated with the media service 102 are described herein.

As used herein, the term "media content" may refer to any form of media that may be distributed by the media service 102 and consumed by an end user of the media service 102. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service 102. Such media programs that are made available for user consumption by way of the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a media catalogue management facility 106 ("catalogue facility 106"), a user interface facility 108, and a storage facility 110 selectively and communicatively coupled to one another. The facilities may be communicatively coupled one to another by any suitable communication technologies.

Storage facility 110 may be configured to store media content data 112 representative of media content that may be distributed by distribution facility 104, media catalogue data 114 representative of information about the media content, and user interface data 116 generated and/or used by user interface facility 108 to provide one or more user interfaces for use by end users of the media service 102 to discover, access, and/or consume the media content, such as described herein. Storage facility 110 may maintain additional or alternative data as may serve a particular implementation.

Distribution facility 104 may be configured to distribute media content to users of the media service 102. Distribution facility 104 may be configured to distribute media content in any way and/or form that is suitable to facilitate consumption of the media content by users of the media service 102.

In certain examples, distribution facility 104 may be configured to distribute media content by way of multiple different media content distribution channels. For example, distribution facility 104 may be configured to distribute media content by way of a digital media distribution channel and a physical media distribution channel. The digital media distribution channel may include on-demand streaming and/or downloading of data representative of the media content from a media service provider server system to one or more user computing systems by way of a network (e.g., an Internet Protocol ("IP") wide area network such as the Internet). The physical media distribution channel may include distribution of physical media that holds data representative of the media content. For example, the physical media distribution channel may include a media vending kiosk-based distribution channel through which physical media, such as digital versatile discs ("DVDs"), BLU-RAY discs, and/or other physical computer-readable copies of media content are distributed to users of the media service 102.

Figure 2:
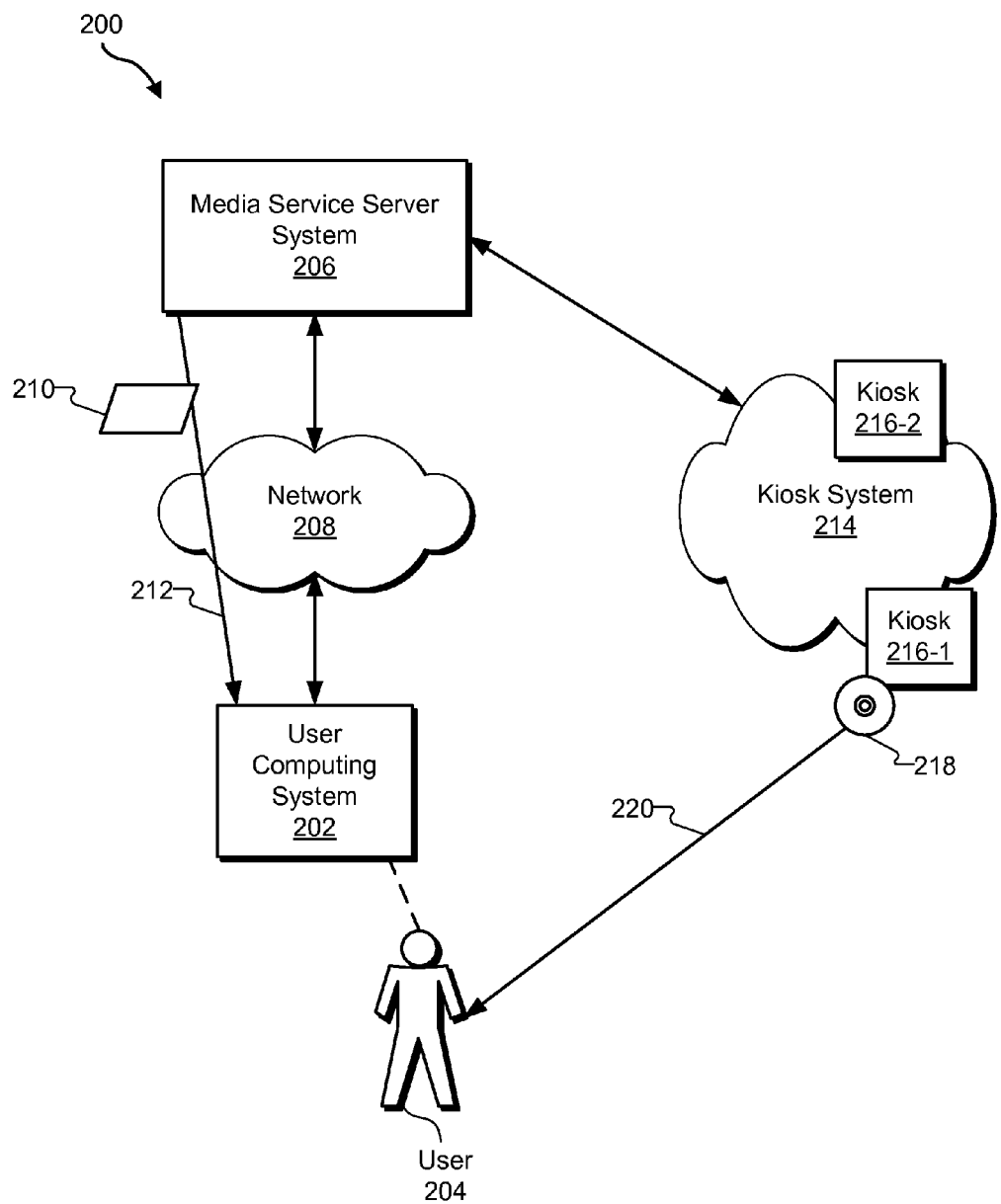
FIG. 2 illustrates an exemplary media content distribution configuration according to principles described herein.

FIG. 2 illustrates an exemplary media content distribution configuration 200. Components of system 100 may be implemented by one or more of the elements of the configuration 200 shown in FIG. 2. As shown, the configuration 200 may include a user computing system 202 associated with a user 204, who may be an end user of the media service 102. User computing system 202 may be in communication with a media service server system 206 ("server system 206"), which may include one or more computing devices (e.g., server devices) remotely located from user computing system 202 and/or operated by a provider of the media service 102.

User computing system 202 and server system 206 may communicate using any communication platforms and technologies suitable for transporting data (e.g., media content data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media content) and/or communications signals between user computing system 202 and server system 206. Communications between user computing system 202 and server system 206 may be transported using any one of the above-listed networks, or any combination or sub-combination of the above-listed networks. Alternatively, user computing system 202 and server system 206 may communicate in another way such as by direct connections between user computing system 202 and server system 206.

The configuration 200 may support distribution of media content, through the media service 102, by way of multiple different media distribution channels, such as a digital media distribution channel and a physical media distribution channel. As shown, server system 206 may distribute media content such as digital data 210 representative of a media program to user computing system 202 by way of a digital media distribution channel 212. This distribution may utilize any suitable media streaming and/or downloading technologies (e.g., Internet media streaming and/or downloading technologies) to support delivery of digital data representative of media content to user computing system 202 by way of network 208.

As further shown in FIG. 2, server system 206 may be in communication with a media vending kiosk system 214, which may include one or more geographically distributed vending kiosks 216 (e.g., vending kiosks 216-1 and 216-2) configured to vend physical copies of media content, such as a physical copy 218 of a media program, to user 204 by way of a physical media distribution channel 220. For example, user 204 may visit a location of media vending kiosk 216-1 and obtain the physical copy 218 of the media program from the media vending kiosk 216-1. In certain examples, one or more of the vending kiosks 216 may include automated media vending machines.

The user computing system 202 may be configured for use by the user 204 to access the media service 102 provided by system 100. For example, the user 204 may utilize the user computing system 202 to access one or more user interfaces provided by system 100 as part of the media service 102, and to present the user interfaces for use by the user 204 to discover, access, and/or consume media content distributed by way of the digital media distribution channel 212 and/or the physical media distribution channel 220 as part of the media service 102.

The user computing system 202 may include one or more user computing devices associated with the user 204. Examples of such devices include, without limitation, a media player computing device (e.g., a media disc player device such as a DVD or BLU-RAY disc player device), a display device, a set-top box device, a digital video recording ("DVR") device, a computer, a tablet computer, a smart phone device, and any other device capable of accessing the media service 102 and/or media content provided by system 100 by way of the media service 102.

In certain examples, the user computing system 202 may include a first user computing device (e.g., a primary display device) configured to play back media content and a second user computing device (e.g., a secondary or companion display device) configured to display a graphical user interface that may compliment or be used together with the playback of the media content by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service 102) may be displayed. Such an example is illustrative only. Other examples of user computing system 202 may include any combination of user computing devices or a single user computing device configured to perform any of the user computing system and/or device operations described herein.

Returning to FIG. 1, in certain examples, distribution facility 104 may be configured to provide users of the media service 102 with access to media content by way of a plurality of different media distribution models ("distribution models"). Each distribution model may define a particular way that an end user of the media service 102 may gain access to media content through the media service 102. Thus, a user of the media service 102 may be able to gain access to media content by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media content distribution model may include the digital media distribution channel 212 of FIG. 2, and a physical media distribution model may include the physical media distribution channel 220 of FIG. 2.

Additionally or alternatively, the distribution models may include different compensation-based models for gaining access to media content. For example, the distribution models may include one or more subscription-based distribution models and one or more transactional-based distribution models. A subscription-based distribution model may be defined by a service provider to provide a user with access to certain media content based on a subscription of the user to the media service 102 (e.g., a monthly-fee subscription, a temporary free-trial subscription, or another defined subscription). A transactional-based distribution model may be defined by a service provider to provide a user with access to certain media content based on discrete transactions dedicated to accessing specific media content. For example, access to a media program may be provided in exchange for a fee dedicated to a rental or a purchase of the media program. The conditions of the access may be defined to be different for a rental and a purchase of the media program, in which case each of the rental and the purchase may be a different transaction-base distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
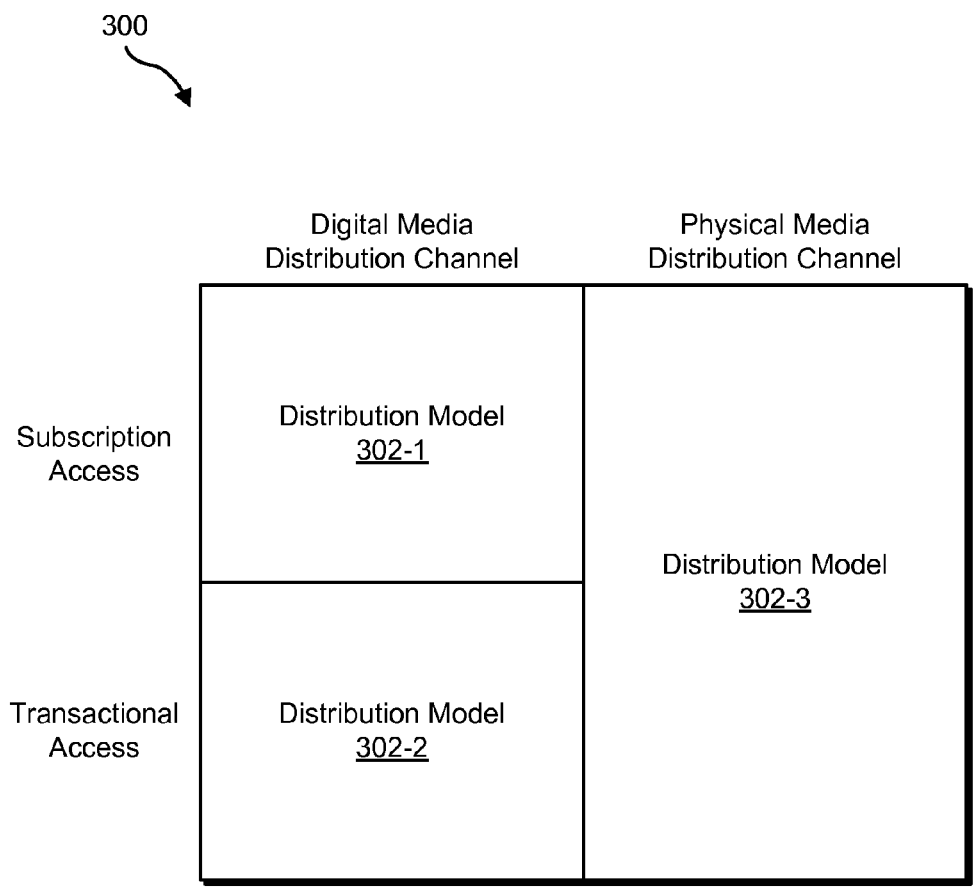
FIG. 3 illustrates a table representing an exemplary set of different media distribution models by way of which access to media content may be provided by way of a media service according to principles described herein.

Distribution facility 104 may be configured to provide users of the media service 102 with access to media content by way of any of the different distribution models described herein, or by way of any combination or sub-combination thereof. As an example, FIG. 3 illustrates a table 300 representing a set of different distribution models by way of which access to media content may be provided through the media service 102 in certain implementations. As shown, the set of distribution models includes a first distribution model 302-1 associated with subscription-based access to media content by way of a digital media distribution channel, a second distribution model 302-2 associated with transactional-based access to media content by way of the digital media distribution channel, and a third distribution model 302-3 associated with either or both subscription-based or transactional-based access to media content by way of a physical media distribution channel.

Media content distributed by distribution facility 104 as part of the media service 102 may be assigned to one or more of the distribution models provided by distribution facility 104. For example, certain media content may be made available by way of all of the distribution models and certain media content may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

System 100 may be configured to provide one or more tools to facilitate user discovery of media content distributed by distribution facility 104 through the media service 102. The discovery may include discovery of information about media content, including information representative of distribution models by way of which the media content is accessible through the media service 102 and/or other information about the media content that is specific to one or more of the distribution models. To this end, system 100 may maintain and/or access data representative of information about media content distributed by distribution facility 104.

Returning to FIG. 1, catalogue facility 106 may be configured to maintain a catalogue that includes information about media content accessible through the media service 102. The catalogue may be represented as media catalogue data 114 in storage facility 110. The information in the catalogue may include any information about or otherwise related to the media content, including media content metadata, enriched metadata, titles, identifiers, synopses, descriptions, genres (e.g., romantic comedy, action, etc.), categories (e.g., animated, television programs, movies, etc.), ratings (e.g., G, PG, PG-13, etc.), release dates, actors, directors, producers, descriptive tags (e.g., user-generated tags), keywords, awards, geographic locations, durations, closed captioning information, format information (e.g., high definition ("HD"), standard definition ("SD"), DVD, BLU-RAY, etc.), availability information (e.g., out of stock, available, blacked out, etc.), information about distribution models by way of which media content is accessible through the media service 102, and/or any other information about the media content.

The catalogue may be generated by merging a plurality of discrete, independent source catalogues such that information included in the source catalogues is comprehensively and non-redundantly included in the catalogue. Thus, the catalogue may include comprehensive information that is an aggregate of non-redundant information obtained from the plurality of source catalogues.

The merging of source catalogues to generate the integrated, comprehensive catalogue may be performed in any suitable way. For example, the merging may be performed by catalogue facility 106, by a provider of the media service 102, by another entity for use by the provider of the media service 102, or any combination or sub-combination thereof.

In certain examples, the merging may be performed based on pattern matching in which media program matches are identified across source catalogues. The pattern matching may be performed in any suitable way. For example, certain information such as titles and release dates for media programs in the source catalogues may be compared by catalogue facility 106. If the result of the comparison indicates that a possibility of a match is above a predefined threshold, additional information about the media programs (e.g., description, synopsis, cast, etc.) may be compared. If the comprehensive result of both comparisons indicates that a possibility of a match is above a predefined final threshold, catalogue facility 106 may determine that the media programs are a match and treat them as the same media program in the merged catalogue. If the comprehensive result of both comparisons indicates that the possibility of a match does not satisfy the predefined final threshold, catalogue facility 106 may determine that the media programs are not the same media program or may request a decision from an operator of system 100.

Additionally or alternatively, the merging may be performed based on a universal identifier associated with each media program represented in the source catalogues. In this case, the same media program will have the same universal identifier across the source catalogues. Accordingly, catalogue facility 106 may use the identifier to identify matching media programs across the source catalogues.

After identifying matching media programs across the source catalogues in any suitable way, catalogue facility 106 may aggregate information about the matching media programs from the source catalogues and add the aggregate information to the merged catalogue to represent the media program. The merge may be an inclusive merge such that the information for the media program included in the merged catalogue may be comprehensive. For example, if a first source catalogue indicates that closed captioning is available for a media program and a second source catalogue does not indicate that closed captioning is available for the matching media program, catalogue facility 106 may inclusively merge the information such that the merged catalogue will be comprehensive and indicate that closed captioning is available for the media program. As another example, if a first source catalogue indicates that a media program is available in a first format and a second source catalogue indicates that the matching media program is available in a second format, catalogue facility 106 may inclusively merge the information such that the merged catalogue will be comprehensive and indicate that the media program is available in the first and second formats. The comprehensive information for the media program, as maintained in the merged catalogue, may support convenient, intuitive, and/or comprehensive title-centric discovery of the media program, such as described herein.

The source catalogues from which the merged catalogue is generated may correspond to different distribution models, including any of the exemplary distribution models described herein. For example, a first source catalogue may include information for media content accessible by way of a first distribution model, and a second source catalogue may include information for media content accessible by way of a second distribution model. Accordingly, the merged catalogue may include comprehensive information for media content accessible by way of the first distribution model and/or the second distribution model.

The merged catalogue may include information indicating all of the distribution models by way of which media content is accessible through the media service 102. For example, for a media program represented in the merged catalogue, the merged catalogue may include information indicating each of the distribution models by way of which the media program is accessible through the media service 102. In certain examples, comprehensive information indicating the distribution models by way of which media content is accessible through the media service 102 may be used by user interface facility 108 to filter media content to select which media content and/or associated information to represent in a user interface, such as described herein.

Figure 4:
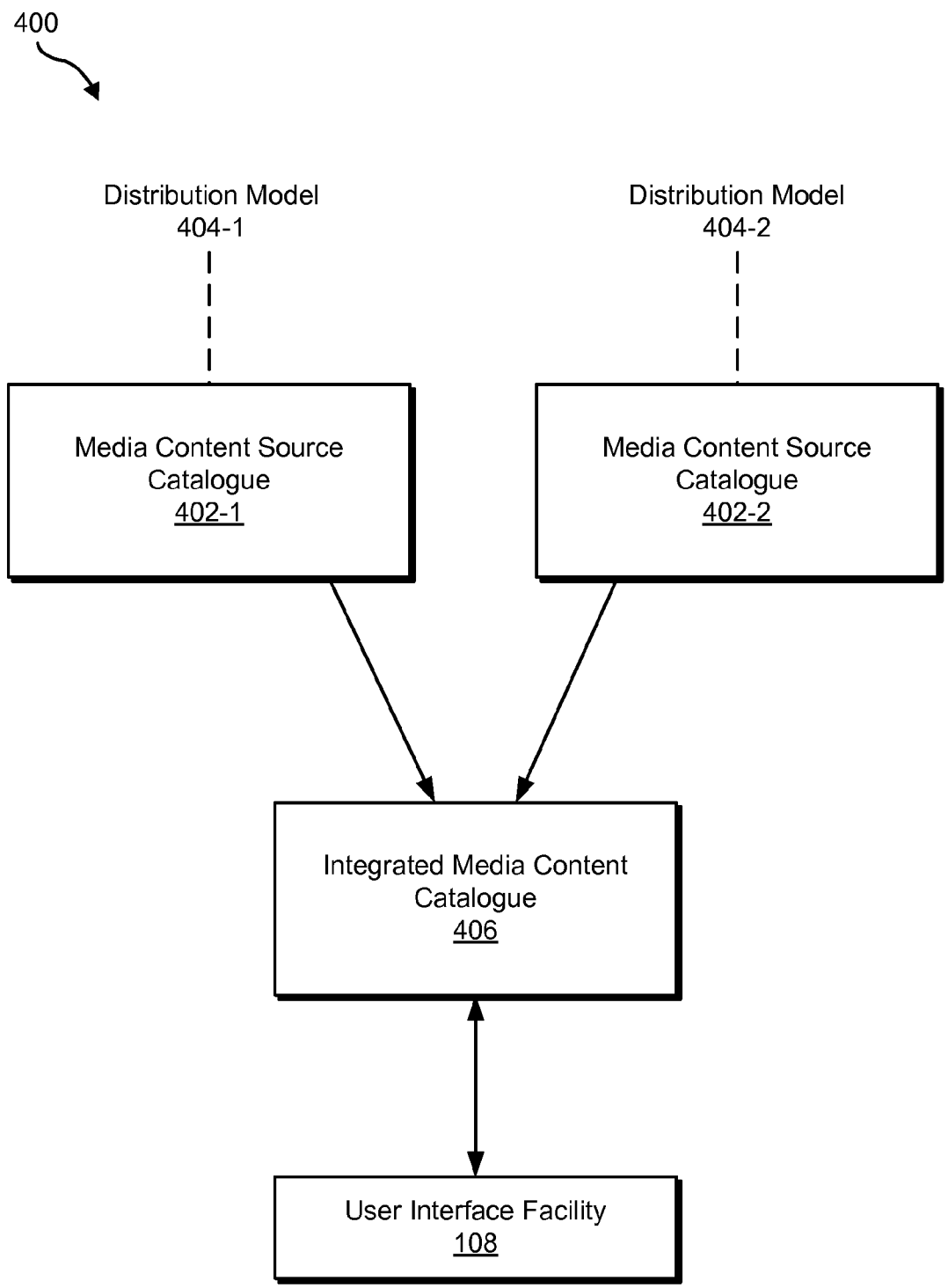
FIG. 4 illustrates an exemplary media content catalogue configuration according to principles described herein.

FIG. 4 illustrates an exemplary configuration 400 in which discrete media content source catalogues 402 (e.g., media content sources catalogues 402-1 and 402-2) include information about media content respectively accessible by way of distribution models 404 (e.g., distribution models 404-1 and 404-2). Source catalogues 402 are merged into an integrated media content catalogue 406 in any suitable way, including in any of the ways described herein, and catalogue facility 106 maintains catalogue 406 as media catalogue data 114 stored in storage facility 110.

The merge may be performed at any suitable time, including over time. For example, source catalogues 402 may be individually updated to reflect the current sets of media content accessible by way of the corresponding distribution models 404. The updates may be propagated into catalogue 406 in any suitable way. Accordingly, the information in catalogue 406 may accurately represent the merged information of source catalogues 402 at any given time.

The example shown in FIG. 4 is illustrative only. Any set of source catalogues 402 respectively associated with any set of distribution models 404 may be merged to form catalogue 406.

As shown in FIG. 4, user interface facility 108 may be configured to access catalogue 406, such as by querying catalogue 406 to obtain information about media content from catalogue 406. User interface facility 108 may be configured to use information obtained from catalogue 406 to provide a user interface (e.g., to populate a user interface view).

User interface facility 108 may be configured to provide a media service user interface through which the user 204 may access and interface with the media service 102 to discover, access, and/or consume media content. The user interface may be in any suitable form. For example, user interface facility 108 may be configured to provide a website, a client application user interface (e.g., a user interface provided by a client application such as a "mobile app" installed and running on the user computing system 202), a media player user interface, a graphical user interface, and/or any other form of user interface configured to facilitate user interaction with the media service 102. Accordingly, the user 204 may utilize the user computing system 202 to access a user interface provided by user interface facility 108 in order to interact with the media service 102 to discover, access, and/or consume media content distributed as part of the media service 102.

User interface facility 108 may be configured to provide a user interface based on comprehensive information about media content that is included in a catalogue (e.g., catalogue 406) of information maintained by catalogue facility 106. For example, as mentioned above, user interface facility 108 may obtain comprehensive information about media content from catalogue 406 and use the obtained information to populate a user interface. The inclusion of the comprehensive information in the user interface may support discovery of the comprehensive information by a user.

User interface facility 108 may support the discovery of comprehensive information about media content regardless of a user interface context from which a user request for information about media content is received. For example, the user interface provided by user interface facility 108 may have different contexts from which requests for information about media content may be received from a user. Without respect to the particular context from which such a request is received, user interface facility 108 may provide comprehensive information about the media content. In certain examples, this may be referred to as "title-centric" media content discovery in which user interface facility 108 is configured to provide comprehensive information about a media program regardless of the user interface context from which a user request for information about the media program is received. Examples of user interface views, user interface contexts, and comprehensive information provided in user interface views will now be described in additional detail.

Figure 5:
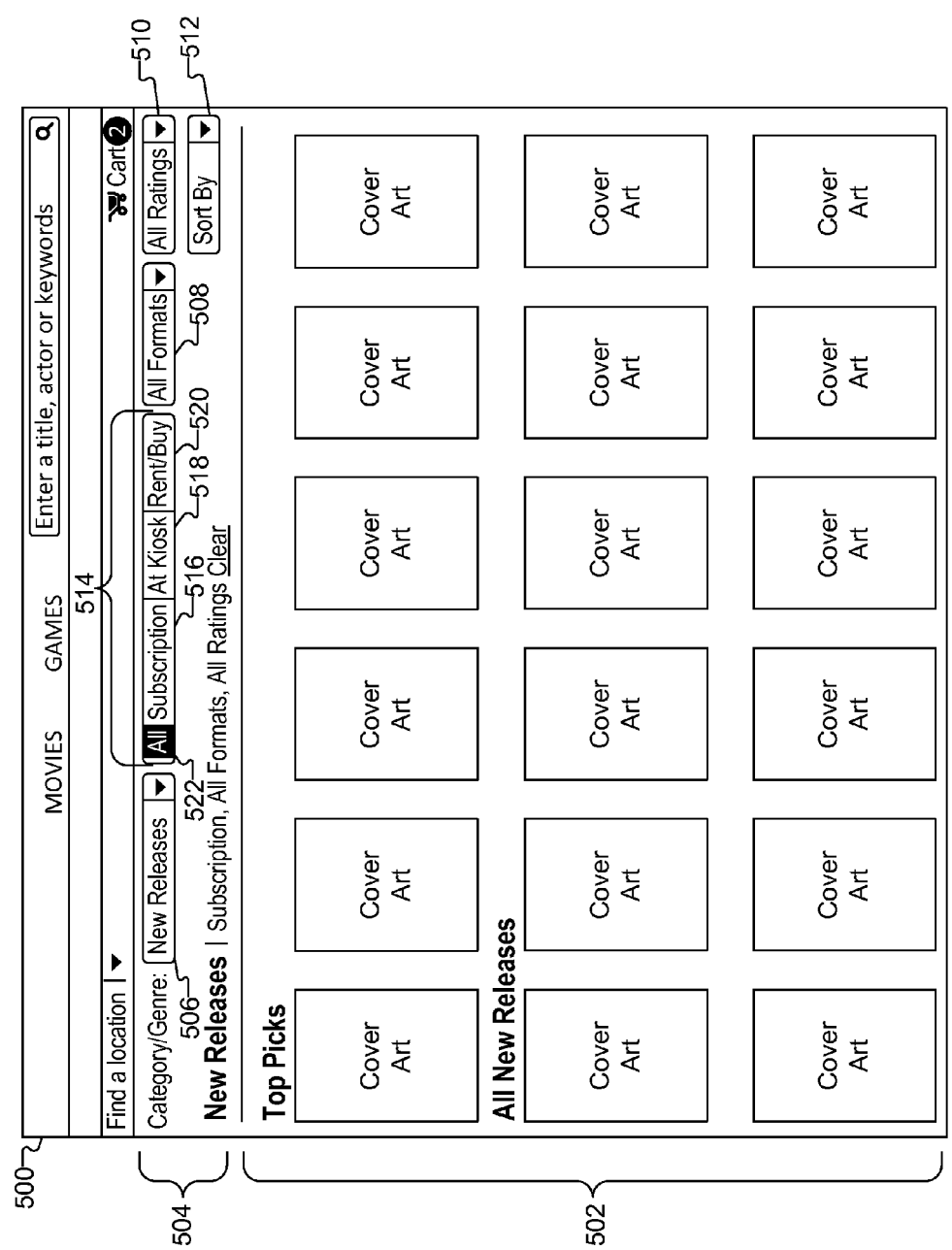
FIGS. 5-8 illustrate exemplary media service user interface views according to principles described herein.

FIG. 5 illustrates a media browse view 500 ("browse view 500") of a media service user interface as may be displayed on a display screen. When browse view 500 is displayed, a user may browse for media content, such as by providing input to navigate browse content displayed in a browse area 502 of browse view 500. As shown, the browse content may include a grid of images (e.g., cover art images) that represent media programs available for access through the media service 102.

Browse view 500 may further include a filter area 504 that includes one or more tools for filtering the browse content displayed in browse area 502. As shown, filter area 504 may include a category selection tool 506 for use by a user to select a particular category of media content to be represented in browse area 502, a format selection tool 508 for use by a user to select a particular media format (e.g., HD, SD, DVD, BLU-RAY, etc.) of media content to be represented in browse area 502, a rating selection tool 510 for use by a user to select a particular rating (e.g., a Motion Picture Association of America ("MPAA") rating such as G, PG, PG-13, or R rating) of media content to be represented in browse area 502, and a sort tool 512 for use by a user to sort the media content represented in browse area 502 by a particular sorting condition.

Filter area 504 may further include a distribution model filter tool 514 (e.g., a filter bar) for use by a user to select a distribution model of media content to be represented in browse area 502. Filter tool 514 may include a plurality of user-selectable options corresponding to different media distribution models. As shown, filter tool 514 may include a user-selectable option 516 configured to be selected by a user to filter the browse content in browse area 502 to represent only media content that is accessible by way of a subscription-based distribution model, a user-selectable option 518 configured to be selected by a user to filter the browse content in browse area 502 to represent only media content that is accessible by way of a physical vending kiosk-based distribution model, and a user-selectable option 520 configured to be selected by a user to filter the browse content in browse area 502 to represent only media content that is accessible by way of a transaction-based distribution model.

Filter tool 514 may also include a user-selectable option 522 configured to be selected by a user to remove any of filters 516, 518, and 520 such that the browse content in browse area 502 is not filtered by a specific distribution model. That is, when option 522 is selected, browse content in browse panel 102 may depict media content accessible through the media service 102 by way of any of the distribution models. In FIG. 5, option 522 is selected and the browse content in browse panel 102 depicts media content accessible by way of any of the distribution models. Thus, the browse view 500 shown in FIG. 5 may be said to provide a browse context of a user interface that is all-inclusive of distribution models (i.e., an all-inclusive distribution model browse context).

While the browse view 500 shown in FIG. 5 is displayed, a user may provide input to select any of the user-selectable options 516, 518, and 520 to trigger a filtering of the browse content included in browse area 502. For example, a user may select option 516 to filter the browse content to represent only media content accessible by way of a subscription-based distribution model. User interface facility 108 may receive the user selection of option 516 corresponding to the subscription-based distribution model and provide, in response to the user selection, a filtered browse view that provides a particular user interface context in which only media content accessible by way of the subscription-based distribution model corresponding to option 516 is represented in browse area 502 (i.e., a subscription-based distribution model browse context).

Figure 6:
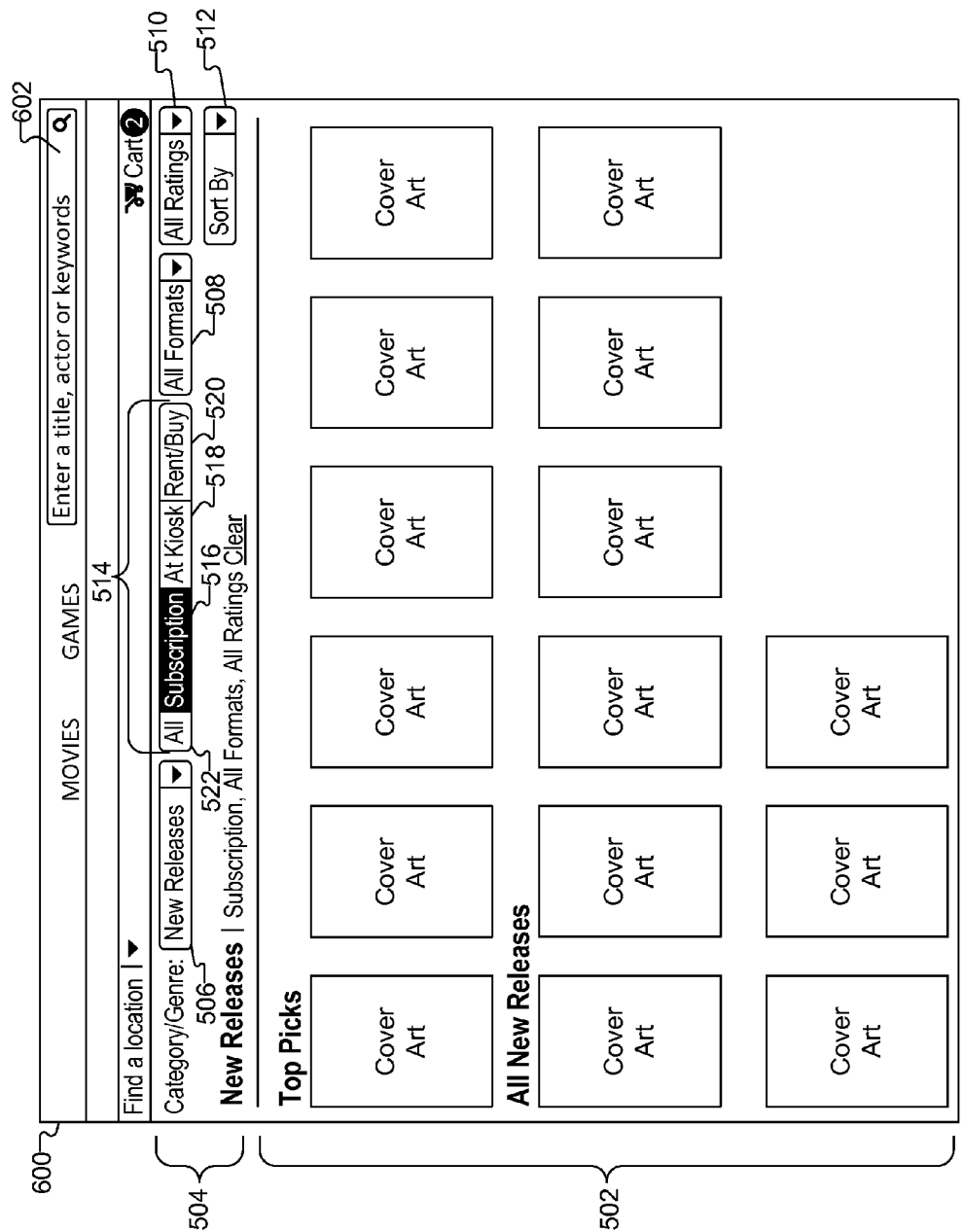

FIG. 6 illustrates an example of a filtered browse view 600 of a media service user interface as may be displayed on a display screen in response to a user selection of option 516. In filtered browse view 600, the browse content included in browse area 502 is filtered to represent only media content that is accessible by way of the subscription-based distribution model that corresponds to option 516. Thus, filtered browse view 600 provides a distribution model specific context of a user interface that is specific to a subscription-based distribution model (i.e., a subscription-based distribution model browse context).

User interface facility 108 may provide a similar filtered browse view that provides a different distribution specific user interface context that represents only media content that is accessible by way of a different distribution model in response to a user selection of another distribution model specific filter option, such as option 518 or 520. Thus, with respect to filtering browse content based on media distribution models, a browse view of a user interface may provide an all-inclusive context, a subscription media content specific context, a kiosk media content specific context, and a transactional media content specific context within which a user may browse media content.

Any of tools 506, 508, 510, and 512 may be used in conjunction with distribution model filter tool 514 to further filter browse content (in addition to distribution model based filtering). In addition, a search tool 602 may be used in conjunction with distribution model filter tool 514 and/or one or more of the other tools 506, 508, 510, and 512 to further filter browse content based on one or more search terms. Thus, a user may use any combination of these tools to define filter criteria to be used to filter browse content included in browse area 502.

When browsing media content within a browse view (e.g., within a filtered browse view such as filtered browse view 600) of a user interface, a user may provide input (e.g., within browse area 502) to request information about a particular media program. For example, a user may provide input to select an image in browse area 502 to request information about a media program represented by the image. User interface facility 108 may receive the user request for information about the media program and provide an information view for the media program for display in response to the user request.

The information view may include comprehensive information about the media program, regardless of the user interface context from which the user request is received. For example, whether the user request for information about a media program is received from an all-inclusive distribution model browse context, a subscription-based distribution model browse context, a kiosk-based browse context, or a transactional distribution model browse context, user interface facility 108 may provide an information view of the media program that includes comprehensive information about the media program (e.g., rather than only information specific to an instance of the media program that is distributed by way of one of the distribution models associated with the browse context from which the user request is received). In certain examples, the comprehensive information included in the information view may be consistent regardless of the browse context from which the user request is received.

Figure 7:
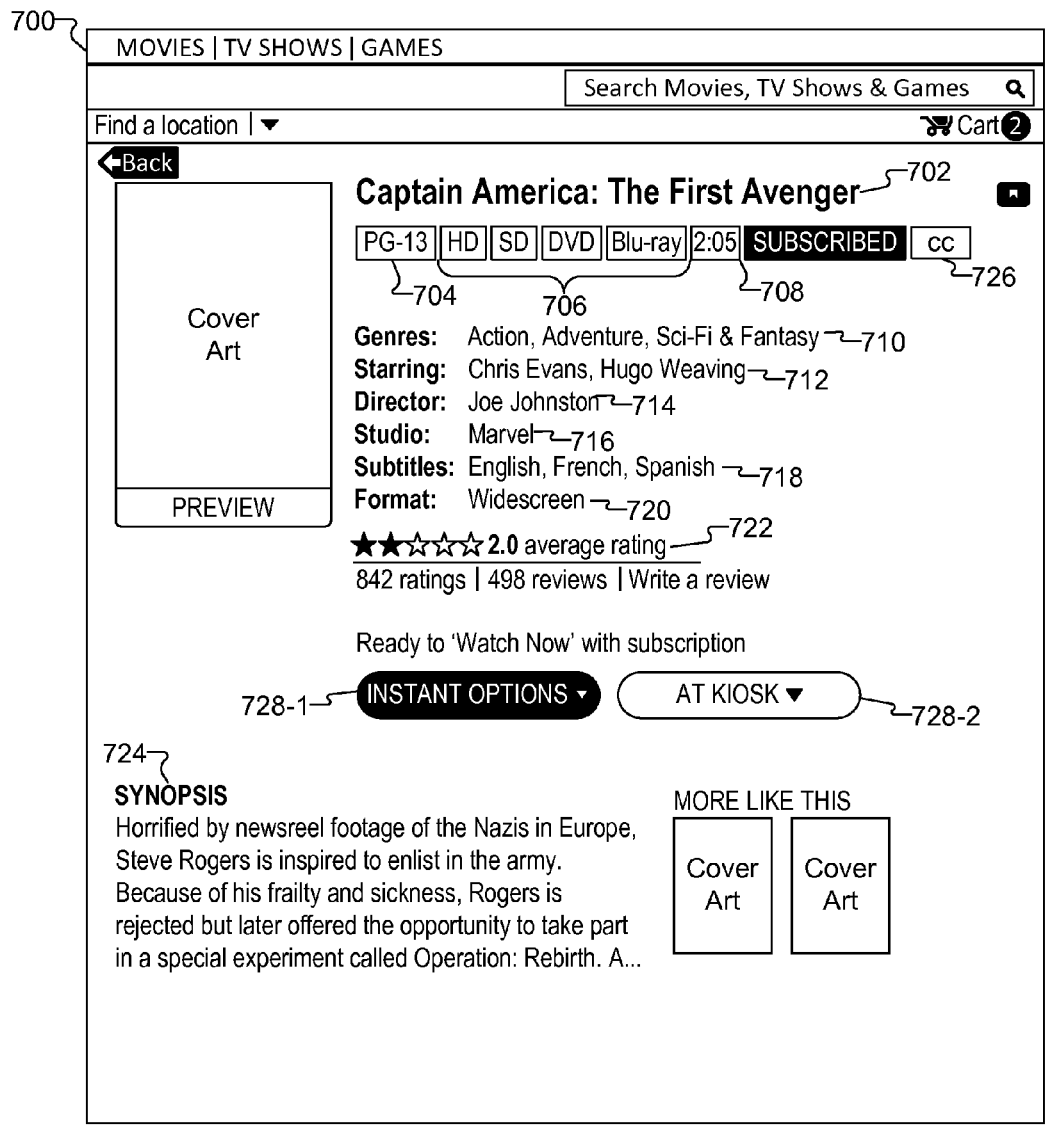

FIG. 7 illustrates an information view 700 of a media service user interface as may be displayed on a display screen. In certain examples, user interface facility 108 may provide information view 700 for display in response to a user request for information about a media program. For example, a user may select, within browse area 502 of filtered browse view 600, an image representative of a media program that is accessible, through the media service 102, by way of a subscription-based distribution model. Information view 700 may include comprehensive information about the media program, such as a title 702 of the media program, an MPAA rating 704 of the media program, available media formats 706 of the media program, a duration 708 of the media program, genres 710 of the media program, cast 712 associated with the media program, a director 714 of the media program, a studio 716 associated with the media program, subtitles 718 associated with the media program, a screen format 720 of the program, a user community rating 722 of the media program, and a synopsis 724 of the media program.

While information view 700 may be displayed in response to a user request received from a browse context that is specific to a subscription-based distribution model, the information included in information view 700 may be comprehensive across all distribution models by way of which the media program is accessible through the media service 102.

For example, the media program may be accessible in SD and HD media formats by way of the subscription-based distribution model. Additionally, the media program may be accessible in DVD and BLU-RAY media formats by way of a kiosk-based distribution model. As shown in FIG. 7, the media format 706 information included in information view 700 may indicate all of the media formats associated with all of the distribution models supported by the media service 102, rather than being limited only to the media formats accessible by way of the subscription-based distribution model.

As another example, the media program may be associated with "Action" and "Adventure" genres in the subscription-based distribution model (e.g., in a source catalogue specific to the subscription-based distribution model) and with "Action," "Adventure," "Sci-Fi," and "Fantasy" genres in another distribution model (e.g., in another source catalogue specific to the other distribution model). As shown in FIG. 7, the genre 710 information included in information view 700 may indicate all of the genres associated with all of the distribution models supported by the media service 102, rather than being limited only to the genres associated with the subscription-based distribution model.

As another example, the media program may be associated with "English" and "Spanish" subtitles in the subscription-based distribution model and with "English" and "French" subtitles in another distribution model. As shown in FIG. 7, the subtitle 718 information included in information view 700 may indicate all of the subtitle language associated with all of the distribution models supported by the media service 102, rather than being limited only to the subtitle languages associated with the subscription-based distribution model.

As another example, the media program may be associated with a set of community ratings in the subscription-based distribution model and with another set of community ratings in another distribution model. The community rating 722 information included in information view 700 may include an overall community rating across all distribution models by way of which the media program is accessible through the media service 102. The overall community rating may be determined by combining the sets of ratings specific to distribution models in any suitable way. Thurs, the overall community rating may be indicated in information view 700, rather than a community rating that is limited to ratings associated with the subscription-based distribution model.

As another example, the media program may not have closed captioning in the subscription-based distribution model but may have closed captioning in another distribution model. As shown in FIG. 7, information view 700 may include a closed captioning indicator 726 that indicates the availability of closed captioning for the media program across all of the distribution models supported by the media service 102, rather than being limited only to indicating the availability or lack of availability of closed captioning in the subscription-based distribution model.

In any of these or similar ways, information view 700 may include comprehensive information about a media program, and the comprehensive information may include information that is specific to a particular distribution model and information that is specific to another particular distribution model. For example, the comprehensive information may include information that is specific to a particular distribution model associated with a user interface context from which a user request for information about the media program is received and information that is not associated with the particular distribution model (e.g., information that is specific to another distribution model).

In certain examples, the comprehensive information about a media program included in an information view may indicate each of the distribution models by way of which the media program is accessible through the media service 102. To illustrate, information view 700 may include user-selectable icons 728 (e.g., icons 728-1 and 728-2) associated with distribution models. In the illustrated example, icon 728-1, which is labeled "instant options," is associated with distribution models that correspond to a digital media distribution channel, and icon 728-2, which is labeled "at kiosk," is associated with a distribution model that corresponds to a physical kiosk-based media distribution channel. A user may select either or both of the icons 728 to request that a drop-down menu of options associated with each selected icon 728 be displayed.

Figure 8:
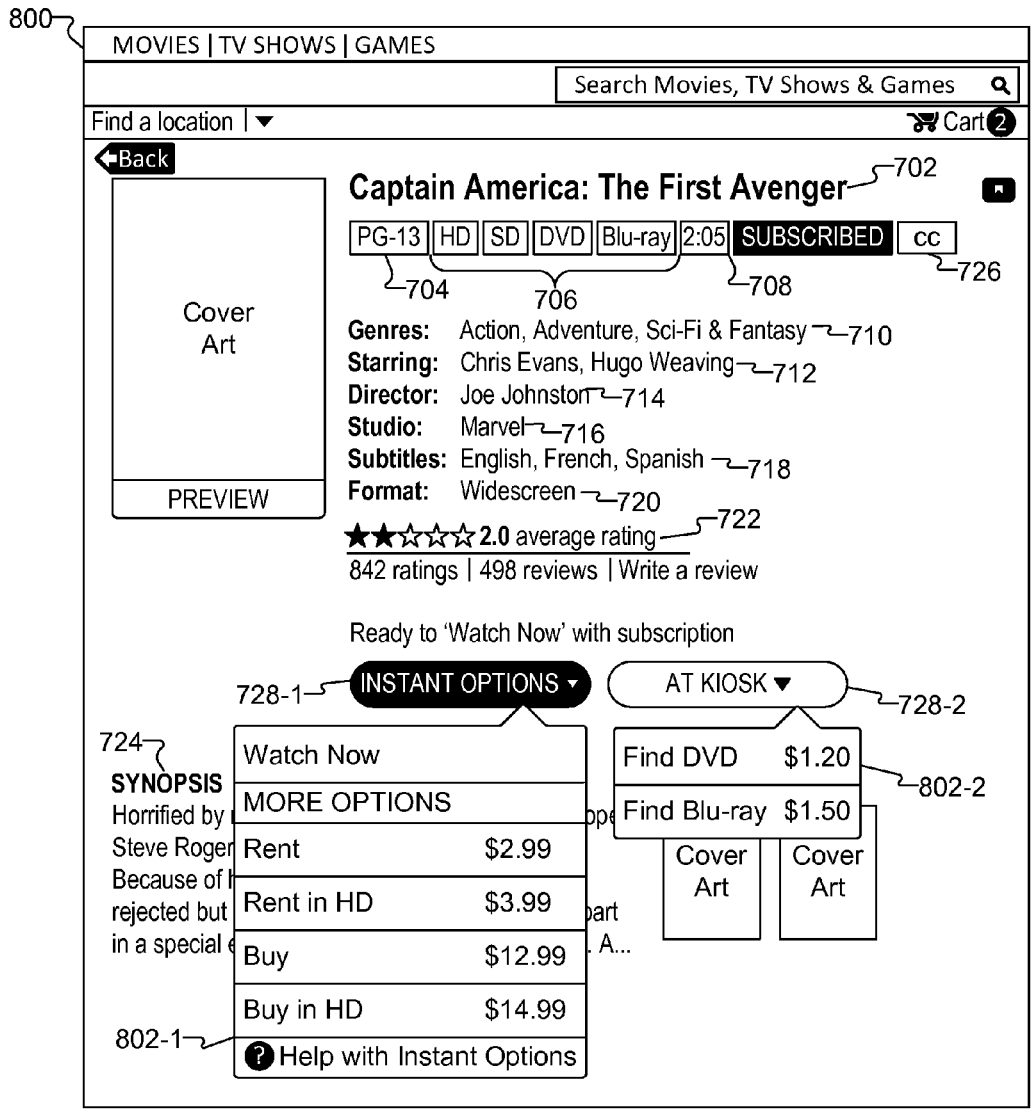

FIG. 8 illustrates an information view 800 of a media service user interface as may be displayed on a display screen. Information view 800 is the same as information view 700 with drop-down menus 802 (e.g., menus 802-1 and 802-2) respectively associated with icons 728 displayed. As shown, each of the drop-down menus 802 includes a set of options for accessing the media program. The options collectively represented in the drop-down menus 802 represent all of the distribution models by way of which the media program is accessible through the media service 102.

The options in drop-down menu 802-1 include a "watch now" option to access and consume the media program by way of a subscription-based distribution model. The options in drop-down menu 802-1 further include options to "rent," "rent in HD," "buy," and "buy in HD" to access the media program by way of a transactional-based distribution model. The options in drop-down menu 802-2 include options to "find DVD" and "find BLU-RAY" to access the media program by way of a kiosk-based distribution model.

Figure 9:
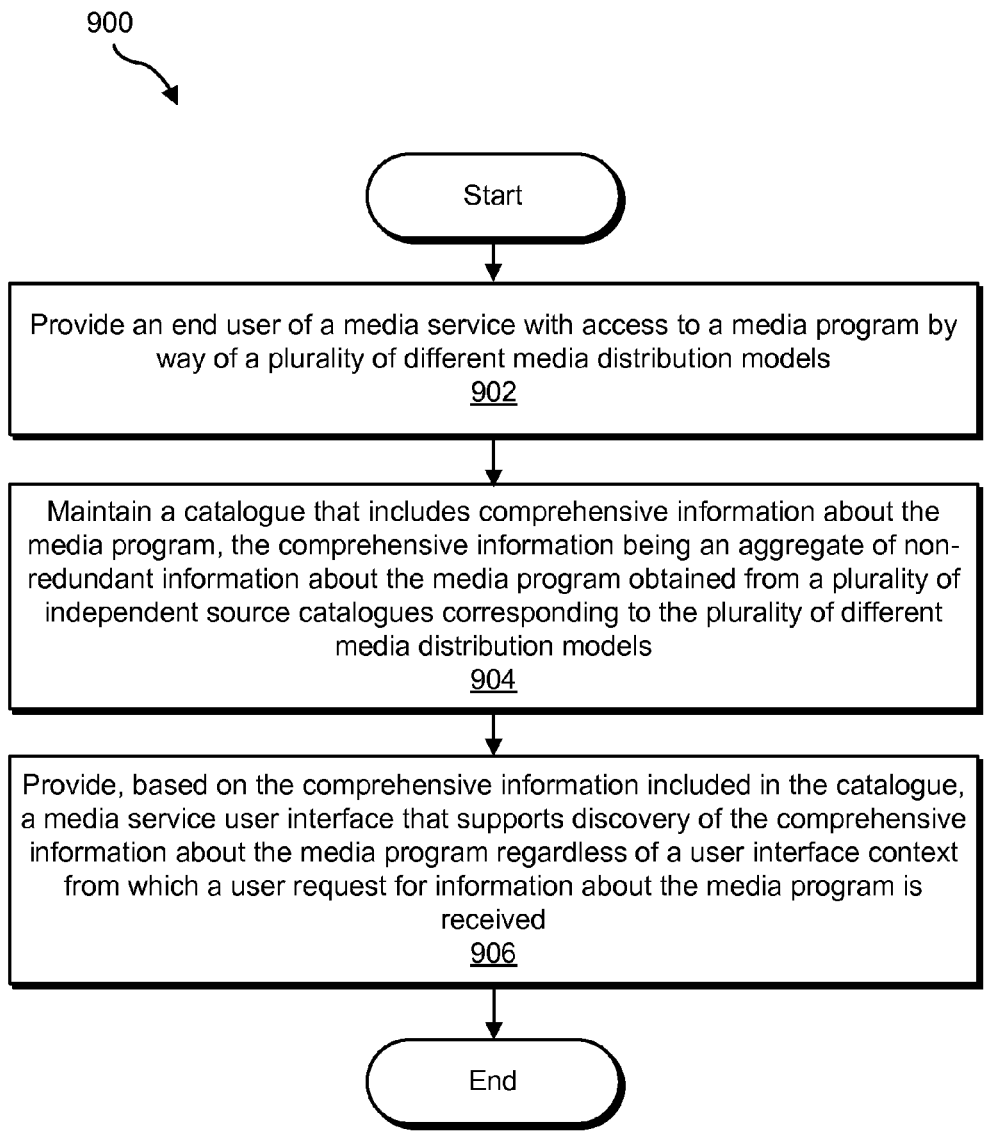
FIGS. 9-10 illustrate exemplary media program discovery methods according to principles described herein.

FIG. 9 illustrates an exemplary media content discovery method 900 according to principles described herein. While FIG. 9 illustrates exemplary steps according to certain embodiments, other embodiments may omit, add to, reorder, combine, and/or modify any of the steps shown in FIG. 9. In certain embodiments, one or more of the steps shown in FIG. 9 may be performed by system 100 and/or one or more components or implementations of system 100.

In step 902, a system (e.g., system 100) provides an end user of a media service (e.g., media service 102) with access to a media program by way of a plurality of different media distribution models, such as described herein.

In step 904, the system maintains a catalogue that includes comprehensive information about the media program, the comprehensive information being an aggregate of non-redundant information about the media program obtained from a plurality of independent source catalogues corresponding to the plurality of different media distribution models. Step 904 may be performed in any of the ways described herein.

In step 906, the system provides, based on the comprehensive information included in the catalogue, a media service user interface that supports discovery of the comprehensive information about the media program regardless of a user interface context from which a user request for information about the media program is received. Step 906 may be performed in any of the ways described herein. In certain examples, step 906 may include the system providing any of the exemplary user interface views described herein.

Figure 10:
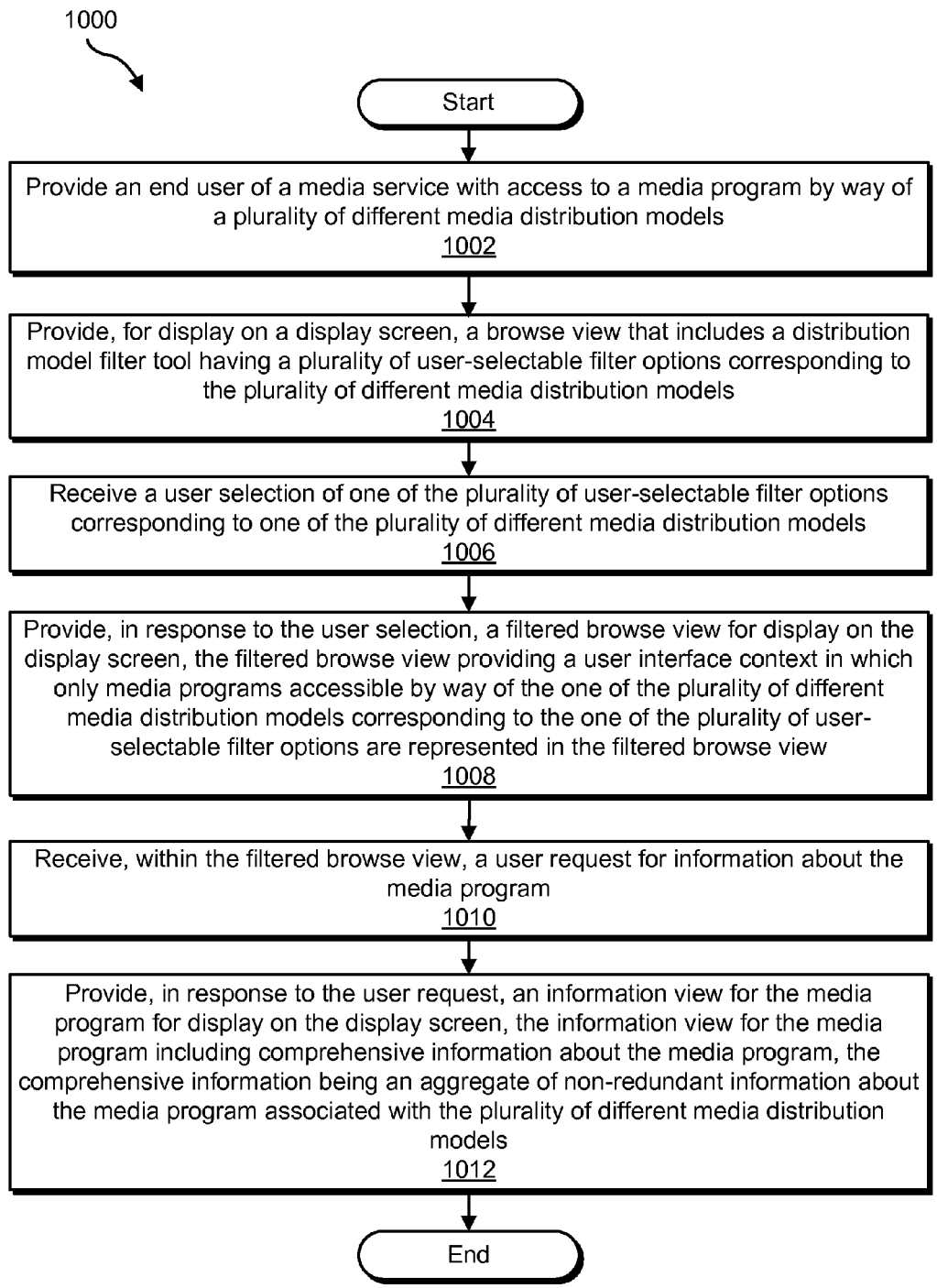

FIG. 10 illustrates an exemplary media content discovery method 1000 according to principles described herein. While FIG. 10 illustrates exemplary steps according to certain embodiments, other embodiments may omit, add to, reorder, combine, and/or modify any of the steps shown in FIG. 10. In certain embodiments, one or more of the steps shown in FIG. 10 may be performed by system 100 and/or one or more components or implementations of system 100.

In step 1002, a system (e.g., system 100) provides an end user of a media service (e.g., media service 102) with access to a media program by way of a plurality of different media distribution models, such as described herein.

In step 1004, the system provides, for display on a display screen, a browse view that includes a distribution model filter tool having a plurality of user-selectable filter options corresponding to the plurality of different media distribution models, such as described herein. In certain examples, step 1004 may include the system providing any exemplary user interface browse view described herein.

In step 1006, the system receives a user selection of one of the plurality of user-selectable filter options corresponding to one of the plurality of different media distribution models, such as described herein.

In step 1008, the system provides, in response to the user selection, a filtered browse view for display on the display screen, the filtered browse view providing a user interface context in which only media programs accessible by way of the one of the plurality of different media distribution models corresponding to the one of the plurality of user-selectable filter options are represented in the filtered browse view, such as described herein. In certain examples, step 1008 may include the system providing any exemplary user interface filtered browse view described herein.

In step 1010, the system receives, within the filtered browse view (and thus from within the user interface context provided by the filtered browse view), a user request for information about the media program, such as described herein.

In step 1012, the system provides, in response to the user request, an information view for the media program for display on the display screen, the information view for the media program including comprehensive information about the media program, the comprehensive information being an aggregate of non-redundant information about the media program associated with the plurality of different media distribution models. Step 1012 may be performed in any of the ways described herein. In certain examples, step 1012 may include the system providing any exemplary user interface information view described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 11:
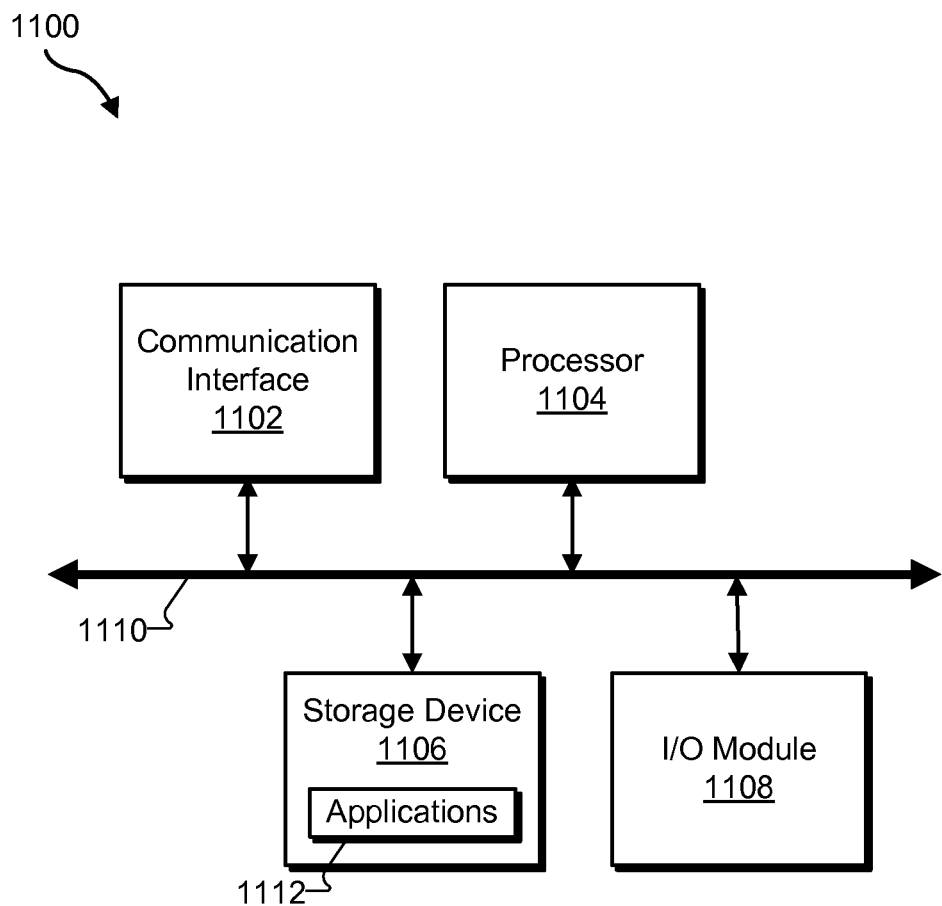
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. Communication interface 1102 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1102 may be configured to interface with any suitable communication media, protocols, and formats.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another non-transitory computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with one or more of the systems and/or facilities described herein. Likewise, any of the storage facilities described herein may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media service provider system, an end user of a media service with access to a media program by way of a plurality of different media distribution models;

maintaining, by the media service provider system, a catalogue that includes comprehensive information about the media program, the comprehensive information being an aggregate of non-redundant information about the media program obtained from a plurality of independent source catalogues corresponding to the plurality of different media distribution models; and providing, by the media service provider system based on the comprehensive information included in the catalogue, a media service user interface that supports discovery of the comprehensive information about the media program regardless of a user interface context from which a user request for information about the media program is received; wherein the comprehensive information includes information regarding a particular distribution model included in the plurality of different distribution models that is not represented in the user interface context from which the user request for information about the media program is received.

2. The method of claim 1, wherein the providing of the media service user interface comprises:

providing a filtered browse view for display on a display screen, the filtered browse view providing a particular user interface context in which only media programs accessible by way a particular one of the media distribution models are represented in the filtered browse view;

receiving, within the filtered browse view, the user request for information about the media program; and providing an information view for the media program for display in response to the receiving of the user request, the information view for the media program including the comprehensive information about the media program.

3. The method of claim 2, wherein the comprehensive information about the media program included in the information view comprises:

information about the media program that is specific to the particular one of the media distribution models; and information about the media program that is specific to another one of the media distribution models.

4. The method of claim 3, wherein:

the information specific to the particular one of the media distribution models indicates one or more media formats of the media program associated with the particular one of the media distribution models; and the information specific to the another one of the media distribution models indicates one or more additional media formats of the media program associated with the another one of the media distribution models.

5. The method of claim 2, wherein the comprehensive information about the media program included in the information view comprises information about the media program not associated with the particular one of the media distribution models.

6. The method of claim 2, wherein the comprehensive information about the media program included in the information view indicates each of the media distribution models by way of which the media program is accessible through the media service.

7. The method of claim 1, wherein the providing of the media service user interface comprises providing a browse view that includes a filter bar having a plurality of user-selectable filter options corresponding to the plurality of different media distribution models.

8. The method of claim 7, wherein the providing of the media service user interface further comprises:

receiving a user selection of one of the plurality of user-selectable filter options corresponding to one of the plurality of different media distribution models; and providing a filtered browse view for display on a display screen in response to the user selection, the filtered browse view providing a particular user interface context in which only media programs accessible by way of the one of the plurality of different media distribution models corresponding to the one of the plurality of user-selectable filter options are represented in the filtered browse view.

9. The method of claim 1, wherein the plurality of different media distribution models comprise a digital media distribution channel and a physical media distribution channel.

10. The method of claim 9, wherein the physical media distribution channel comprises a vending kiosk-based distribution channel.

11. The method of claim 1, wherein the plurality of different media distribution models comprise a subscription-based media distribution model and a transaction-based media distribution model.

12. The method of claim 11, wherein the subscription-based media distribution model and the transaction-based media distribution model are associated with a digital media distribution channel.

13. The method of claim 1, wherein the catalogue is generated by inclusively merging the plurality of independent source catalogues corresponding to the plurality of different media distribution models.

14. The method of claim 1, embodied as computer-executable instructions on at least one non-transitory computer-readable medium.

15. A method comprising:

providing, by a media service provider system, an end user of a media service with access to a media program by way of a plurality of different media distribution models;

providing, by the media service provider system for display on a display screen, a browse view that includes a distribution model filter tool having a plurality of user-selectable filter options corresponding to the plurality of different media distribution models;

receiving, by the media service provider system, a user selection of one of the plurality of user-selectable filter options corresponding to one of the plurality of different media distribution models;

providing, by the media service provider system in response to the user selection, a filtered browse view for display on the display screen, the filtered browse view providing a user interface context in which only media programs accessible by way of the one of the plurality of different media distribution models corresponding to the one of the plurality of user-selectable filter options are represented;

receiving, by the media service provider system within the filtered browse view, a user request for information about the media program; and providing, by the media service provider system in response to the user request, an information view for the media program for display on the display screen, the information view for the media program including comprehensive information about the media program, the comprehensive information being an aggregate of non-redundant information about the media program associated with the plurality of different media distribution models, wherein the comprehensive information about the media program included in the information view comprises:
information about the media program that is specific to the one of the media distribution models corresponding to the selected one of the plurality of user-selectable filter options; and
information about the media program that is not associated with the one of the media distribution models corresponding to the selected one of the plurality of user-selectable filter options.

16. The method of claim 15, wherein:
the information about the media program that is specific to the one of the media distribution models corresponding to the selected one of the plurality of user-selectable filter options indicates at least one of a media format, a genre, and a subtitle language specific to the one of the media distribution models corresponding to the selected one of the plurality of user-selectable filter options; and
the information about the media program that is not associated with the one of the media distribution models corresponding to the selected one of the plurality of user-selectable filter options indicates at least one of an additional media format, and additional genre, and an additional subtitle language specific to a different one of the media distribution models.

17. The method of claim 15, wherein the plurality of different media distribution models comprise:
a transactional-based media distribution model associated with a vending kiosk-based media distribution channel;
a transactional-based media distribution model associated with a digital media distribution channel; and
a subscription-based media distribution model associated with the digital media distribution channel.

18. The method of claim 15, embodied as computer-executable instructions on at least one non-transitory computer-readable medium.

19. A system comprising:
at least one computing device that includes:
a media distribution facility that provides an end user of a media service with access to a media program by way of a plurality of different media distribution models,
a media catalogue management facility that maintains data representative of a catalogue that includes comprehensive information about the media program, the comprehensive information being an aggregate of non-redundant information about the media program obtained from a plurality of independent source catalogues corresponding to the plurality of different media distribution models, and
a user interface facility that provides, based on the comprehensive information included in the catalogue, a media service user interface that supports discovery of the comprehensive information about the media program regardless of a user interface context from which a user request for information about the media program is received; wherein the comprehensive information includes information regarding a particular distribution model included in the plurality of different distribution models that is not represented in the user interface context from which the user request for information about the media program is received.

* * * * *